T. KUPFER.
FOOT BRACE FOR ANIMALS.
APPLICATION FILED DEC. 26, 1908.
950,232.
Patented Feb. 22, 1910.
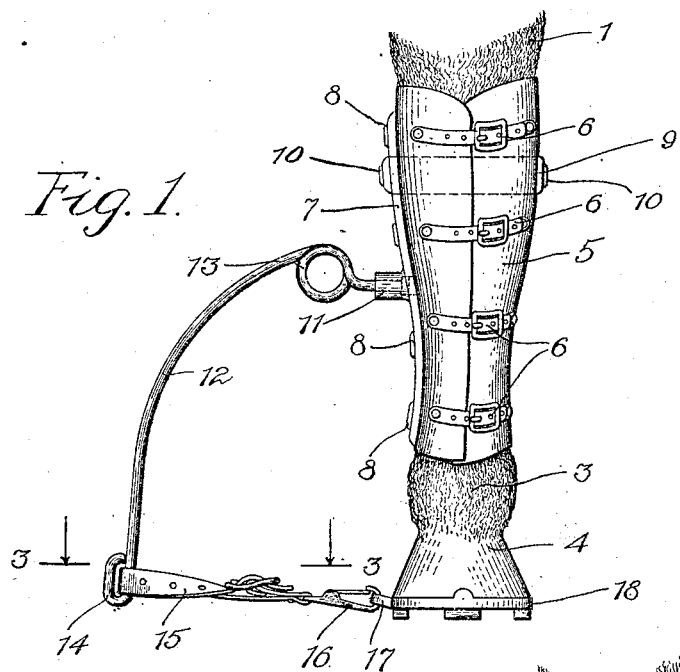
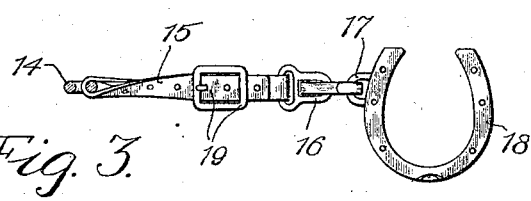
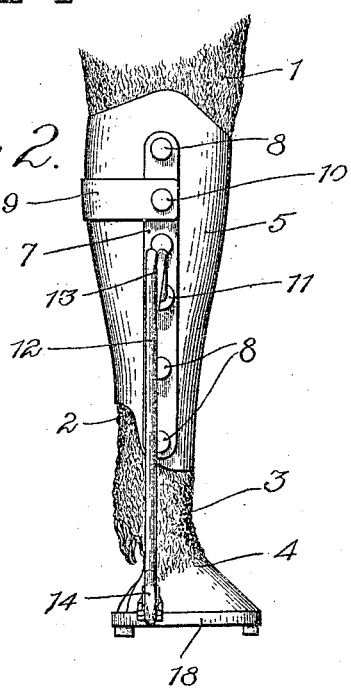
Witnesses:
Inventor
Theodore Kupfer
By Henry H. Morgan
Attorney

UNITED STATES PATENT OFFICE.

THEODORE KUPFER, OF MADISON, WISCONSIN.

FOOT-BRACE FOR ANIMALS.

950,232.  Specification of Letters Patent.  Patented Feb. 22, 1910.

Application filed December 26, 1908. Serial No. 469,441.

*To all whom it may concern:*

Be it known that I, THEODORE KUPFER, a citizen of the United States, residing at Madison, in the county of Dane and State of Wisconsin, have invented new and useful Improvements in Foot-Braces for Animals, of which the following is a full, clear, concise, and exact description, reference being had to the accompanying drawings, forming a part of this specification.

My invention relates to structural appliances for the limbs of animals and is particularly directed toward the provision of a device for affecting the relative position of the foot.

In the care and use of horses it is frequently found that the limbs of an animal interfere with each other in their motion in running and some means must be provided for properly spreading the affecting and affected parts, in order that the animal may be kept sound and useful. The physical defect which it is particularly the object of my invention to eliminate is such interference wherein the animal strikes one limb with the foot of the opposite limb, the affected part of the former being usually in the vicinity of the knee. To the end of curing this affliction devices, operative either over the back of the animal or through the vehicle structure, have been designed but these contrivances have been found cumbersome and complicated and quite impracticable.

My invention contemplates a simple structure, one that operates simply, and one that is closely confined to the afflicted parts.

The device of my invention is a tension structure for urging a particular motion of the foot about the ankle or pastern joint, the strain being imposed upon the proper part of the foot so as to secure its clear path when in action.

More specifically, my improvement comprises a base for the tension member for attachment to the cannon of the animal's limb, the tension member, and means whereby this tension member may be effectively connected with the foot.

This description will be more readily understood by reference to the accompanying drawings wherein I have illustrated a device embodying the features of my invention.

In these drawings Figure 1 is a front elevational view of the device as attached to the limb of a horse; Fig. 2 is a side elevational view thereof; and Fig. 3 is a partial plan view taken on the line 3—3 of Fig. 1.

The same reference characters are applied to the same parts throughout the various figures.

In Figs. 1 and 2 I have illustrated the lower part of the limb of a horse, the knee being shown at 1, the cannon at 2, the ankle or pastern joint at 3, and the foot at 4. In the embodiment of my invention herein shown and particularly described the structural base for the tension member is in the form of a sleeve boot 5 which envelops the cannon of the animal's limb, being securely tightened in place by means of a series of buckle straps 6, 6, as illustrated in the drawings. This sleeve boot preferably extends along a considerable part of the cannon so that the strain thereon may be properly distributed. Longitudinally along the outward side of this boot a plate 7, conveniently of steel, is suitably secured, for instance by means of a plurality of rivets 8, 8. To counteract the strain which, it will be seen, is placed upon this plate, a semicircular yoke 9 is herein shown to surround the rear part of the boot, being riveted in place upon the boot and over the plate 7, as illustrated, by means of the rivets 10, 10. It is evident that this arrangement effectively prevents the response of the boot proper to the imposed stretch.

The plate 7 has a boss 11 extending laterally therefrom which boss directly supports a naturally laterally extending spring. While I have herein shown the boss 11 as approximately centrally disposed relative to the plate 7 I contemplate its disposition at the most convenient position structurally or most advantageous point considering the action of the tension member.

At 12 I have illustrated the spring which is sprung downwardly for attachment to the shoe as will be presently described. If desired, the spring may be coiled as shown at 13 to secure a greater range of flexibility, the typical rotary action being thereby obtained. At its lower end this spring is provided with a loop 14 for the reception of a strap 15 which is arranged for connection to the shoe of the respective foot. This connection is facilitated by the use of a snap hook 16 secured to the end of the strap, which snap hook is adapted for engagement in an eye lug 17 on the shoe 18. It is now apparent that an outward pull will be exerted upon a particular part of the shoe (see Fig. 3). Different horses would, of course, require different corrections in the relative placement of the foot and it is apparent that these various requirements may well be met by placing the eye lug 17 at the most advantageous point on the shoe. For instance, referring to Fig. 3, as the eye lug 17 is moved up and down the foot can be made to assume different positions, depending upon the particular error in the natural position of the foot. In order that the tension may be adjustable, the connecting strap 15 is provided with a buckle arrangement 19 which may be manipulated in the ordinary manner to vary the length of the strap and, consequently, the amount the tension member is sprung. Thus varied conditions may be met both by placing the strain and by adjusting the same. In order that the device may lend itself to the action of the foot in running it is desirable to mount the spring in the boss somewhat in the manner shown in Fig. 1 wherein the spring is provided with an interiorly enlarged head operating in a correspondingly enlarged part of the bore in which the spring is set, thus allowing for responsive rotary movement.

The spring 12 may be shortened to any reasonable extent to avoid interference with the ground, this being particularly necessary if the horse is used for other than track purposes. The constant tension draws the foot of the animal out of reach of his opposite limb but is still so responsive as not to interfere with easy motion in running.

The device may be used to equal advantage upon the fore and hind legs and is not only useful for preventing this "knee-kicking" defect, as has been pointed out, but is also effective in preventing what is commonly known as "cross-fire" interference, that is, interference between the foot of one hind limb with that of the opposite fore limb, a defect frequently found in speed horses.

I claim as new and desire to secure by Letters Patent:

1. A foot brace for animals comprising a boot for enveloping the limb above the ankle joint, a metallic strip longitudinally secured on said boot, a boss on said strip, a spring mounted in said boss, and means arranged to connect said spring with the foot.

2. A foot brace for animals comprising a boot for enveloping the limb above the pastern, bracing means for said boot, a spring member extending laterally from said bracing means, an adjustable connecting strap attached to the end of said spring member, and means for attaching the said connecting strap to the foot.

3. A foot brace for animals comprising a boot for enveloping the limb above the pastern, bracing means for said boot, a member extending laterally from said bracing means, an adjustable connecting strap attached to the end of said member, and means for attaching the said connecting strap to the foot.

In witness whereof, I have hereunto subscribed my name in the presence of two witnesses.

THEODORE KUPFER.

Witnesses:
 ARTHUR H. BOETTCHER,
 W. P. TEARSE, Jr.